UNITED STATES PATENT OFFICE.

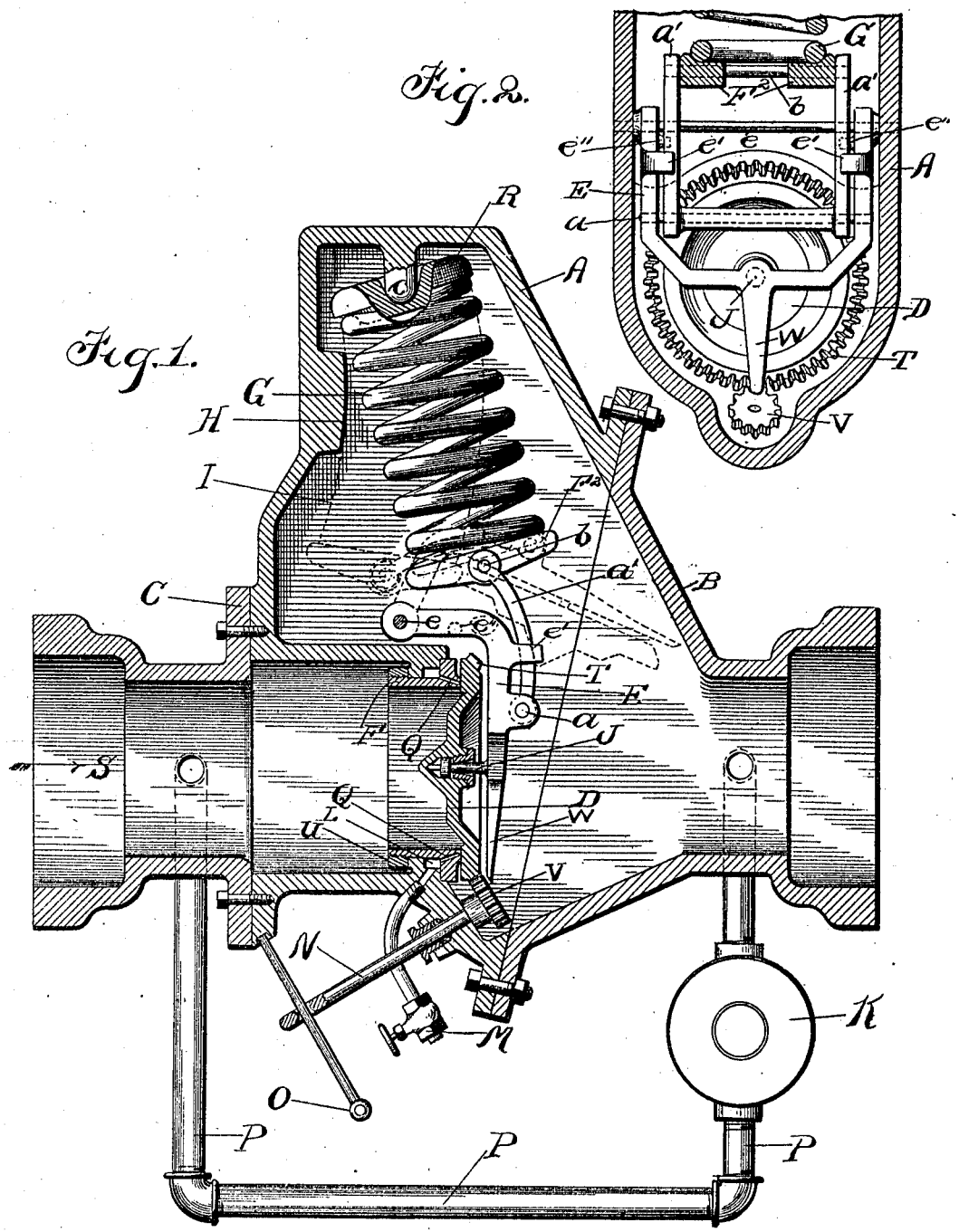

ALBERT BLAUVELT, OF CHICAGO, ILLINOIS.

DETECTOR CHECK-VALVE.

945,151.  Specification of Letters Patent.  Patented Jan. 4, 1910.

Application filed August 19, 1901. Serial No. 72,627.

*To all whom it may concern:*

Be it known that I, ALBERT BLAUVELT, a citizen of the United States, and resident of Chicago, Illinois, have invented certain new and useful Improvements in Detector Check-Valves, of which the following is a specification.

My invention relates to check valves particularly where used in fire service water supply mains and also particularly where water meter service is desired in connection with any such large water mains leading into yards or buildings.

An object of my invention is to construct a check valve which when closed will offer resistance against the movement or initial opening of the check disk sufficiently to prevent moderate water pressure from passing through the check valve proper and so divert such moderate water pressure or flow through an ordinary water meter placed in a by-pass around my check valve, thus causing all probable domestic consumption of water or water stolen or escaping at leaks to be registered by the meter.

Another object of my invention is to construct a check valve capable of inspection test while the check valve contains pressure, to determine whether the check or disk within the valve is or is not upon its fixed seat—in other words—to tell whether the check is tight or leaking while under pressure and thereby assure water company officials whether all flow of water is through the meter or not, or assure inspectors whether water is or is not escaping forward or backward as the pressure may tend through my check valve. Because of accomplishing the last described object, I term my check valve a detector check valve, insomuch as with my check valve it is always possible to readily detect whether it is performing any or all of its functions as a check valve in any situation and under all conditions without any interruption of the service of my check valve, and particularly to detect whether water is wrongly or wastefully flowing through my check valve.

Another object of my invention is to properly and tightly seat the check disk of my check valve, should the same be found not properly seated and tight upon inspection, this I effect by forcing the check disk momentarily away from its seat and, if need be, rotate the check disk to dislodge and wash away any sand, chips or ordinary equivalent matter caught or lodged on the check disk or its seat, all while my check valve contains pressure thus enabling inspectors to quickly and conveniently cause my check valve to become tight, even if found unseated or leaking upon inspection.

Another object of my invention is to construct a check valve having resistance to initial opening, but which when opened much beyond its initial opening as by a violent or voluminous flow of water, will as it becomes fully opened cease to offer special resistance to further opening or remaining open and thus not lessen the capacity of the water main and check valve to pass a large volume and practically undiminished pressure of water for fire purposes, it not being desired to meter or restrict water used for such emergency.

Under the last above described function my invention is adapted also to serve a desired object in water mains supplying hydraulic elevators.

My detector check may be installed in the main supply line to the hydraulic elevator and when the elevator may require a voluminous supply of water my check valve will open wide and offer only a negligible resistance to the large flow of water desired, but when the hydraulic elevator is not operating my detector check will close and divert all small or moderate flow of water (as due to leaks at elevator stuffing box or elsewhere) through the meter for register. Under this plan the service consumption of the elevator may be registered by a motion counter attached to the elevator as is usual and independent of my invention, while my detector check will cause meter registry of night leaks or water stealage not related to actual movement of the hydraulic elevator and hence not shown by a motion counter.

Referring to the drawings—Figure 1 represents a vertical longitudinal sectional view of my check valve and Fig. 2 represents a partial vertical section at a right angle to Fig. 1.

Similar letters designate similar parts.

A—represents the body casing of the check valve with end flanges inclined to facilitate removal for repairs. B and C—represent end pieces attached to said body casing and adapted to connect with such water main as my check valve may be designed to be used with.

D—represents a check disk adapted to seat tightly on an annular seat shown as "F", secured by annular nut "U", and so formed as to leave an annular space "L" having detector holes "Q", "Q", leading to the seat face of the annular seat "F".

E—represents a check disk hinge pivoted on the pivot "e".

G—represents a spring partially compressed.

H—represents an abutment compelling the spring "G" to assume a laterally flexed position, whenever the lower end of said spring may be positioned as in or in approaching the position shown by the dotted outline "I".

J—represents a pivot on which the check disk may wholly or partly rotate.

K—represents a common water meter located in by-pass piping, "P", "P", "P", and thus positioned to measure water passing in the direction shown by the arrow mark "S".

M—represents a detector test cock controlling communication from the face of the annular seat "F", via the detector holes "Q", "Q", and annular space "L" to the outer air.

N—represents a cleaning device shaft bearing a gear pinion "V" and adapted to be either rotated or reciprocated at will by hand manipulation of the detachable lever "O".

R and F²—represent socket supports for the spring "G" and afford the spring a bearing on the pivots "c" and "b" respectively.

a'—represents a swinging arm or link whose lower end is pivoted, at the pivot "a", upon the check disk hinge "E". The upper end of this link may swing within the limits set by the stops "e''" and "e'''" in obedience to the direct or a lateral force of the spring "G" depending on which force may control the link for any given position of the valve mechanism.

T—T—represent gear or spur teeth upon the check disk "D", adapted to engage with the gear pinion "V".

W—represents a prolongation of the check disk hinge "E" against which the gear pinion may be thrust to unseat the check disk "D" for cleaning.

I make the body casing of my valve with inclined flanges so that upon withdrawing the flange bolts the body casing may at once be loosened from the usual gaskets or flange cement by a direct upward lift with no need to separate or disturb the end pieces which in practice are rigidly fixed to the practically immovable water main.

In operation my invention is normally with all parts positioned as shown by the solid lines of the drawing. In such case the check disk is tightly seated and pressed upon its annular seat by the effect of the spring, said spring being under compression sufficiently to cause more than a fair or "normal meter resistance" to flow of water via the check disk in the direction shown by the arrow mark "S". In addition to the force exerted by the spring G, it will be obvious that the communication of the passages Q with the atmosphere when the cock M is open, as hereinafter described, causes an excess of static fluid-pressure upon the outlet side of the valve because of the greater effective area, said excess pressure being transmitted through the by-pass. This differential assists the spring in keeping the valve normally closed, the proportional pressure exerted by the two forces depending upon the design, which may be varied as to spring-tension, area of valve and openings, and the like, as may be found expedient. The meter and by-pass piping then offer less resistance to flow than the check disk and permit flow of any normal consumption of water, the meter measuring such water and being of any size desired for any given service. Should suspicion arise as to whether the check disk be not actually seated and thus be passing unmetered water, the detector test cock "M" may be noted or opened. Should the check disk not be seated tightly on its annular seat, then the detector holes "Q Q" will pass water to the annular space "L" and thence show a full flow of water at the detector test cock. If such evidence is shown by the detector test cock the check disk will usually be leaky because of chips, dirt, &c., between it and its annular seat. By hand manipulation of the lever "O" and shaft "N" thrusting the gear "V" against prolongation "W" of check disk hinge thus forcing the check disk somewhat away from its seat or by rotating the check disk by means of the gear teeth "T T", &c., the dirt or chips will usually be displaced and the proper seating of the check disk evidenced by its necessarily closing the detector holes "Q Q" as it seats with consequent cessation of free flow of water at the test cock. In this manner my check valve may be readily examined and cleaned while under pressure and with no important interruption of service.

In the normal position of parts or as shown by solid lines of Fig. 1, the pivots "a"—"b"—"c" stand approximately in line, preferably as shown with the pivot "b" slightly to the right of an imaginary straight line from pivot "a" to pivot "c" thus enabling the force of the spring "G" to stand firmly upon the link "a'" and thence to the check disk "D" without need for any steadying or lateral tension from the abutment "H".

Immediately any rush of water as for fire or elevator service shall force the check disk away from its seat the first flow of water will be in the form of a thin sheet and will exert a pressure effective toward opening the valve, upon the entire area of the check disk, which area is larger than the area presented to pressure before actual opening of the check disk. At the same time the static differential due to the passages Q entirely disappears. Therefore any given water pressure per square inch and capable of starting the check disk from its seat will immediately afterward have an increased power to force the check disk toward its fully open position.

So soon as the pivot "$a$" (because swinging from the pivot "$e$") has moved somewhat to the right, the pivot "$b$" will be at the left of an imaginary straight line from pivot "$a$" to pivot "$c$" and the link "$a'$" will then be free to leave the stop "$e'$" and move to or toward the stop "$e''$" thus decreasing the distance between pivots "$b$" and "$e$." The direction of action of the spring G is thereby changed, lessening its effective resistance against further opening movement of the check disk. A very moderate pressure of water movement will thereafter cause the check disk to swing or rise to or to approach the position shown by the dotted lines of Fig. 1. Thus it will be seen that the disk is subjected to a resistance to its opening which is greatest before the inauguration of its movement, and that this resistance comprises two components—that due to the difference in effective area, which is purely initial or effective only prior to movement, and that applied by the spring, which decreases as the movement progresses.

I so design the abutment "H" as to force the spring to assume lateral flexure sufficiently to follow the backward or gravity movement of the check disk after any voluminous flow of water for fire or elevator purposes shall have ceased, and also sufficiently to swing back the link "$a'$" and if needful kick or flip it into the position shown by solid lines of Fig. 1, so soon as the check disk shall seat or be near its seat.

The abutment "H" may vary in outline with varying lengths or strengths of spring and may contact higher up or lower down on the spring as needful to secure the degree and period of action of lateral flexure of spring desired.

In the best adjustment of my invention the extension or compression of the spring "G" is very slight, the spring remains at nearly a constant length or compression and its principal movement is a lateral swinging movement below the fixed pivot "$c$," while despite the force of the spring, my mechanism enables me to produce in my detector check valve a check valve whose check disk will close by gravity from any of its more open positions similarly to a common check valve.

I do not confine my construction to the particular disposition of parts illustrated and may place the detector test cock or meter or by-pass or cleaning device at either side, if desired. I can also so control the spring as to cause it to close the check disk unassisted by gravity, if any situation made it preferable to put in my valve upside down from as shown.

I prefer a valve wholly of metal but can use composition seats alike to existing check valves, if desired.

Having described my invention, its uses and applications, that which I claim and for which I desire Letters Patent, is:—

1. In a check valve having a spring controlled check disk and a seat therefor, a check disk hinge pivoted rearwardly from the plane of the check disk seat, and a spring pressed link coöperating with said hinge.

2. In a check valve device, the combination of a check-valve, a hinge or lever carrying such valve, a link coöperating with said hinge, and a spring connected with such link and pivotally mounted.

3. In a check valve device, the combination of a casing, a check-valve therein, a hinge or lever on which the valve is mounted, a spring having a seat or support at one end and bearing against the casing at the other end, and a link connecting said support and hinge.

4. In a check valve device, the combination of a casing, a check-valve therein, a hinge on which the valve is mounted, a spring pivoted at one end in the casing and having a spring-seat or support at the other end, and a link pivotally connected to the spring-seat and hinge respectively.

5. In a check valve device, the combination of a casing, a check-valve therein, a hinge on which the valve is mounted, a spring having spring-seats at its ends, one of said seats being pivotally connected to the casing, and a link connected with the other spring-seat and hinge respectively.

6. In a check valve device, the combination of a casing having a passage therethrough and provided with a lateral extension, a check-valve arranged within the casing to govern said passage, a spring arranged within said casing extension and having spring-seats at its ends, one of which seats is pivotally connected to the outer end of such extension, a hinge on which the valve is mounted and a link connected with the other spring-seat and hinge respectively.

7. In a water main check valve device, the combination of a check disk having gear teeth I, a hinge on which said disk is mounted, and a gear wheel V adapted to engage said gear teeth and arranged to contact with the hinge and thereby force the disk from its seat.

8. In a water main check valve device the combination of a check disk having a prolongation W and a cleaning device for such valve comprising the rotatable pinion V adapted when rotated to coöperate with such disk and also adapted when reciprocated to bear against such prolongation W and force the disk from its seat; substantially as described.

9. In a water main check valve device, the combination with the check valve, of combined means for rotating and lifting the check valve, comprising a rotatable and reciprocatable pinion V coöperating with the check valve and also adapted when reciprocated to bear against such valve; substantially as described.

10. In a check valve device, the combination of a pivoted check valve, a lever device operatively connected therewith, a spring coöperating with the lever device and adapted to normally keep the valve seated, and means for compelling lateral distortion of the spring when the valve is in open position; substantially as described.

11. In a check valve having a check disk, a spring for controlling said disk, a check disk hinge, a valve body having a pivot carrying one end of the spring, and a spring abutment located to compel lateral distortion of the spring when the check disk is in an open condition.

12. In a check valve, the combination of a spring controlled check disk, a pivot controlling the path of movement of the check disk, a link connected to the check disk, a spring bearing upon the link, and a body casing having bearing points for the check disk pivot and spring.

13. A valve mechanism comprising a seat, a movable valve member, and a spring exercising a constant tendency to seat the valve member, the force exerted thereby becoming less as said valve member is moved from its seat.

In testimony, that I claim the foregoing as my invention, I have signed my name in presence of two witnesses, this twelfth day of August, 1901.

ALBERT BLAUVELT.

Witnesses:
J. R. GATHERCOAL,
R. HATHAWAY.